United States Patent [19]

Tyler

[11] Patent Number: 5,747,946
[45] Date of Patent: May 5, 1998

[54] GAS DISCHARGE LAMPS AND SYSTEMS

[75] Inventor: Peter Michael Tyler, Woodmancote, England

[73] Assignee: Smiths Industries Public Limited Corporation, London, England

[21] Appl. No.: 709,818

[22] Filed: Sep. 10, 1996

[30] Foreign Application Priority Data

Sep. 21, 1995 [GB] United Kingdom ............. 9519283

[51] Int. Cl.$^6$ .......................................... G05F 1/00
[52] U.S. Cl. .................. 315/291; 315/330; 315/60; 315/DIG. 1; 315/DIG. 4; 313/607; 313/594
[58] Field of Search ................. 315/60, 291, 330, 315/335, 340, 351, 354, DIG. 1, DIG. 4; 313/607, 594, 619, 234

[56] References Cited

U.S. PATENT DOCUMENTS

| | | | |
|---|---|---|---|
| 2,003,898 | 6/1935 | Mitscherling | 313/607 X |
| 3,890,540 | 6/1975 | Ott | 315/335 |
| 5,030,894 | 7/1991 | Yoshiite et al. | 315/335 |
| 5,420,481 | 5/1995 | McCanney | 315/291 |
| 5,432,398 | 7/1995 | Kogelschatz | 313/607 X |

FOREIGN PATENT DOCUMENTS

| | | |
|---|---|---|
| 0 653 903 | 5/1995 | European Pat. Off. . |
| 236155 | 3/1926 | United Kingdom . |
| 404448 | 1/1934 | United Kingdom . |

*Primary Examiner*—Robert Pascal
*Assistant Examiner*—Haissa Philogene
*Attorney, Agent, or Firm*—Pollock, Vande Sande & Priddy

[57] ABSTRACT

A fluorescent discharge lamp has two glow mode electrodes wound around it in a helical fashion. One circuit drives the main electrodes at opposite ends of the lamp at high levels of brightness. Another circuit drives the glow mode electrodes at low levels of brightness, at about 10MHz. At intermediate levels of brightness, both the main electrodes and the glow mode electrodes are driven, the two sets of electrodes being driven for alternate on and off periods with the glow mode electrodes being on when the main electrodes are off and the glow mode electrodes being off when the main electrodes are on.

19 Claims, 2 Drawing Sheets

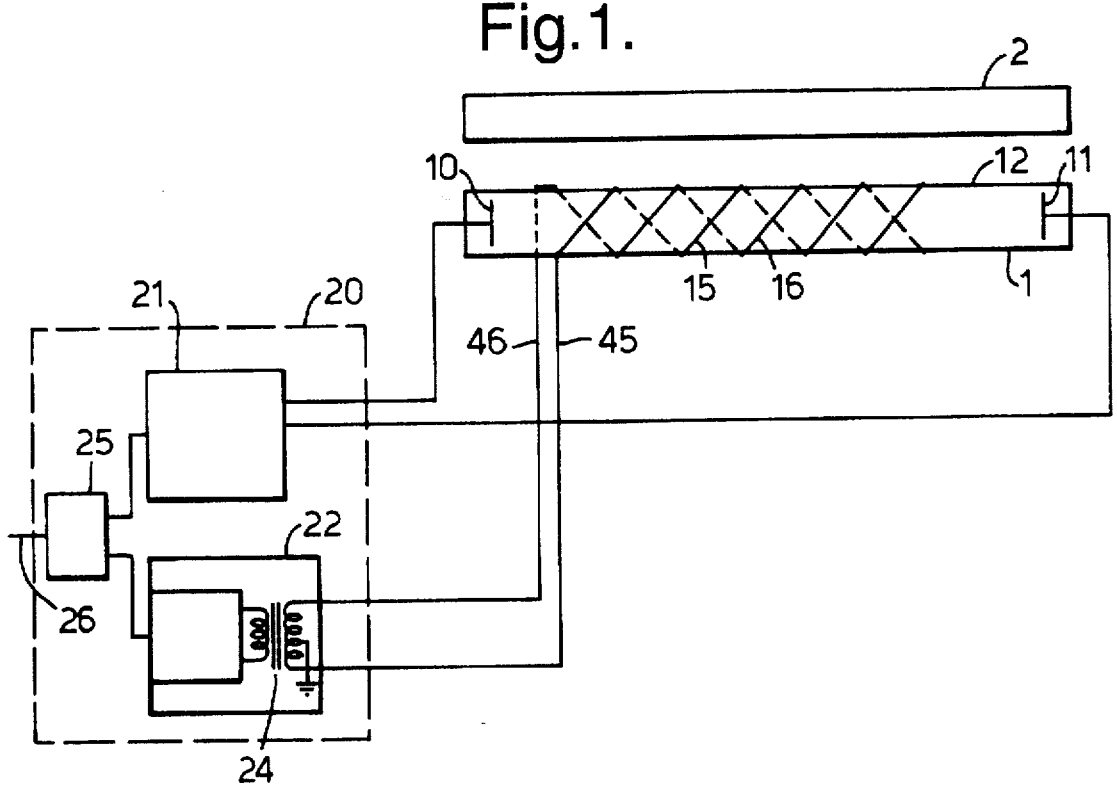
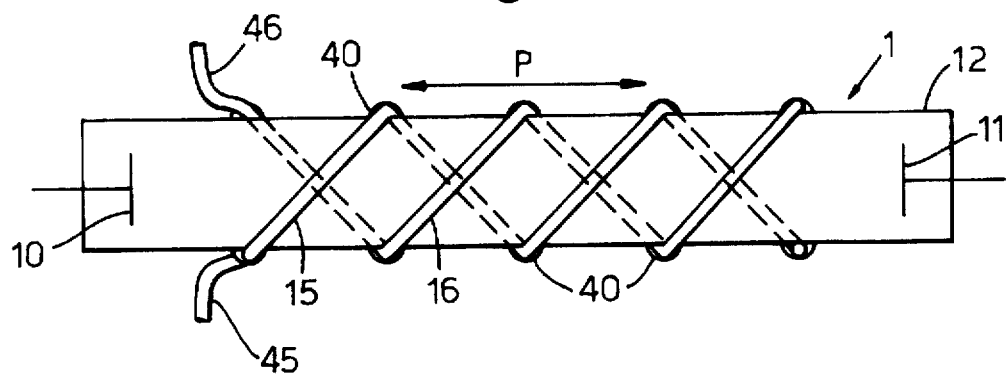

GAS DISCHARGE LAMPS AND SYSTEMS

BACKGROUND OF THE INVENTION

This invention relates to gas discharge lamps and systems.

The invention is more particularly concerned with gas discharge lamps and systems including control circuits for such lamps that enable them to be dimmed.

Gas discharge lamps, such as fluorescent lamps, have advantages of being able to produce high intensity light with a low power dissipation, of having a relatively long life and of being relatively robust. One disadvantage, however, with these lamps is that their brightness cannot be well controlled over a wide range. Most commercially-available fluorescent lamp dimmers operate by varying the mark-to-space ratio of the drive signal applied to the lamp and can only control brightness over a range of about 150:1, although some dimmers for aerospace applications are capable of controlling light output in the range 2000:1. In U.S. Pat. No. 5,420,481 there is described a fluorescent lamp system having glow mode electrodes in addition to the two normal electrodes at opposite ends of the lamp. These electrodes extend externally along the length of the lamp and are used to produce low level light output, which enables the output range to be considerably increased. One problem, however, with these glow mode electrodes is that any irregularity or misalignment in the walls of the lamp can lead to a non-uniform field from the glow electrodes and, hence, to a non-uniform light output. Some fluorescent lamps used to backlight displays are bent into a serpentine shape, so as to give a more even illumination over the surface of the display. This form of lamp presents substantial problems in achieving an even illumination using the previous form of glow mode electrodes.

EP-A-653903 describes a fluorescent tube in which one of the discharge electrodes is connected to the end of a single helical wire extending about the tube. As voltage is increased, the discharge moves gradually along the length of the tube.

BRIEF SUMMARY OF THE INVENTION

It is an object of the present invention to provide an improved gas discharge lamp and system.

According to one aspect of the present invention there is provided a gas discharge lamp including an elongate envelope filled with a discharge gas, a first pair of electrodes located at opposite ends of the envelope for causing discharge within the envelope and two glow mode electrodes each in the form of elongate conductive members wound in a helix about the envelope so that any point on one of the glow mode electrodes has a corresponding point located diametrically opposite on the other glow mode electrode.

The pitch of the helix of the two conductive members is preferably approximately equal to twice the external diameter of the lamp, and the conductive members may be wires.

According to another aspect of the present invention there is provided a gas discharge lamp system including a lamp according to the above one aspect, a first circuit for driving the first pair of electrodes and a second circuit for driving the glow mode electrodes. The system is preferably arranged such that at high brightness only the first circuit drives the lamp, at low brightness only the second circuit drives the lamp, and at intermediate brightness the first circuit drives the first pair of electrodes for successive periods separated by spaces and the second circuit drives the glow mode electrodes only during the spaces between the periods when the first pair of electrodes are being driven. The first circuit is preferably arranged to reduce the space between periods of its output, the second circuit being arranged to increase the space between the periods of its output when an intermediate brightness of the lamp is to be increased. The second circuit is preferably arranged to drive the glow mode electrodes at a frequency of the order of at least 5 MHz, which may be 10 MHz. The second circuit preferably includes a transformer having a center tap of a secondary winding connected to ground, the two glow mode electrodes being connected to opposite ends of the secondary winding. The system may include a dc or low frequency supply also connected to the glow mode electrodes so as to provide heating of the lamp.

According to a further aspect of the present invention there is provided a method of driving a gas discharge lamp of the kind having an elongate envelope filled with a discharge gas, a first pair of electrodes located at opposite ends of the envelope for causing discharge within the envelope and two helical glow mode electrodes extending along a part at least of the length of the envelope so that any point on one of the glow mode electrodes has a corresponding point located diametrically opposite on the other glow mode electrode, wherein the lamp is driven by energizing only the first pair of electrodes at high brightness levels, energizing only the glow mode electrodes at low brightness levels, and at intermediate brightness levels energizing the first pair of electrodes for successive periods separated by spaces, and energizing the glow mode electrodes only during the spaces between the periods when the first pair of electrodes are driven.

The method may include driving the glow mode electrodes at a frequency of the order of at least 5 MHz. The method may include the steps of reducing the space between periods of signals supplied to the first pair of electrodes and increasing the space between periods of signals supplied to the glow mode electrodes when an intermediate brightness of the lamp is to be increased.

BRIEF DESCRIPTION OF THE DRAWINGS

FIG. 1 is a schematic side elevation view of the lamp system;

FIG. 2, constituting FIG. 3 is a plan view of a part of the lamp in greater detail.

DETAILED DESCRIPTION OF THE PREFERRED EMBODIMENTS

Figure 2A:
FIGS. 2A–2F, illustrates the outputs from the driving circuit of the system at different brightness.

With reference first to FIGS. 1 and 2, the lamp 1 is shown, for simplicity as being a straight, cylindrical tubular lamp although it could be formed into other shapes, such as serpentine or circular, to suit its particular application. The lamp has two internal electrodes 10 and 11, one at each end of a cylindrical glass envelope 12 of circular section and about 10 mm in diameter. The envelope 12 contains a conventional gas discharge mixture and is coated on its inner surface with a conventional phosphor material. The lamp also has two glow mode electrodes 15 and 16 extending around the outside of the envelope, in a manner that will be described more fully later. The lamp 1 is located behind a liquid crystal display 2 or some other similar transparent display The system also includes a lamp driver unit 20. The unit 20 has two separate driver circuits 21 and 22 connected respectively to the internal electrodes 10 and 11, and to the glow mode electrodes 15 and 16. The first drive circuit 21 is an a.c. current source similar to those used in conventional fluorescent lamp drive circuits. The circuit 21 supplies a fixed frequency, square wave or sine wave output in the range 20–100 kHz. The output of the drive circuit 21 comprises bursts of pulses separated by spaces without pulses, as shown in FIG. 2A. The repetition rate of the bursts and spaces is chosen to be the lowest at which the eye will not perceive a flicker.

The second, glow mode electrode drive circuit 22 is a sine wave voltage source, which produces a much higher frequency than that of the first drive circuit 21, of around 10 MHz with a voltage of 200–300V rms. The drive circuit 22 has an output transformer 24 with its secondary winding center tapped to ground so that the glow mode electrodes 15 and 16, connected to opposite ends of the secondary winding, are driven by balanced signals about ground. This helps minimize the generation of electro-magnetic radiation from the glow mode electrodes, which could otherwise cause interference.

Both the first and second drive circuits 21 and 22 are connected to a brightness control unit 25, which receives an input on line 26 indicative of the desired brightness of the lamp. The control unit 25 appropriately controls the first and second drive circuits 21 and 22 to produce the desired level of brightness.

Figure 2B:

For high levels of brightness of the display, such as around 200 FtL, only the internal electrodes 10 and 11 of the lamp 1 are energized, the control unit 25 holding the second drive circuit 22 off. The control unit 25 controls the magnitude of light output from the lamp 1, in the higher range of illumination, solely by changing the way in which the internal electrodes 10 an 11 are energized. More particularly, the ratio of the length of the bursts of pulses supplied by the first drive circuit 21 to the length of the spaces between the bursts is varied. For maximum illumination, the length of the bursts of pulses is long and there is only a very short space between the pulses. For reduced illumination, the space between the bursts of pulses is increased. FIG. 2B shows that there is no output from the glow mode electrode drive circuit 22 when a high level of brightness is needed.

Figure 2C:
Figure 2D:
Figure 2E:
Figure 2F:

When only a low level of brightness is needed, such as around 0.01 FtL, the control unit 25 holds off the first drive circuit 21, as shown in FIG. 2E. For these low levels of brightness, only the second drive circuit 22 is operative, as shown in FIG. 2F. This circuit 22 supplies bursts of the high frequency sine wave signal to the glow mode electrodes 15 and 16 separated by spaces. Again, the level of brightness at these low levels is varied by altering the ratio between the length of the bursts of high frequency signal and the length of the spaces between them.

For medium levels of brightness, around 1 FtL, the control unit 25 enables both the drive circuits 21 and 22, and more particularly, the control unit is arranged to ensure that only one or the other of these circuits is on at any one time, and that they are not both on together, as shown in FIGS. 2C and 2D. To increase brightness within this range of medium brightness, the length of the bursts of pulses from the first drive circuit 21 is increased and the length of time for which the high frequency signals are supplied to the glow mode electrodes 15 and 16 is correspondingly reduced. To reduce brightness, the length of the bursts of pulses from the first drive circuit 21 is reduced and the length of the bursts of high frequency signals supplied to the glow mode electrodes 15 and 16 is correspondingly increased.

It can be seen, therefore, that as brightness is increased from a minimum, the glow mode will gradually increase until the normal mode comes into operation, following which the glow mode will decrease as the normal mode increases. There may be a jump in brightness when the normal mode first comes into operation but, by making the glow mode peak drive level about ten times the minimum normal mode drive level, it ensures that the jump in brightness is only about 10%, which is barely noticeable to the user. Alternatively, the brightness of the lamp could be actively monitored in the different modes and the relative width of the pulse bursts in the different modes altered to reduce the change in brightness at the transition.

In the arrangement described above, the normal mode and glow mode drive signals are never on at the same time. This is because it has been found that the lamp can flicker when both drive signals are on. However, it is possible to reduce flicker when both signals are on if the high frequency signal applied to the glow mode electrodes 15 and 16 is synchronized to the lower frequency supplied to the internal electrodes 10 and 11.

The glow mode operation gives a dimming range of about 150:1, whereas the normal mode operation gives a dimming range of about 2000:1. Because of the overlap between the two modes, which is about 10:1, this gives a total dimming range of about 30000:1.

The relatively high frequency drive signal supplied to the glow mode electrodes 15 and 16 of 10 MHz prevents the spectrum of the lamp being shifted towards the near infrared end of the spectrum compared with the normal mode. At lower frequencies, of 100's kHz, the glow mode spectrum contains high levels of near infra-red radiation, making a display illuminated with such a lamp difficult to use with night vision aids, which amplify radiation in this range. Also lamps with a lower frequency glow mode would tend to look much pinker at low brightness compared with the normal mode operation at higher brightness. It has been found that, providing the glow mode drive signal is 5 MHz or greater, there is no noticeable change in color as the lamp is dimmed.

Turning now to FIG. 3, the glow mode electrodes 15 and 16 are formed by two resistance wires, which are uninsulated so that there is a maximum efficiency in the glow mode. The electrodes 15 and 16 can also be used as heaters for low temperature environments, by connecting them to a dc or low frequency supply via suitable electronic or electromechanical switching or blocking devices. The uninsulated nature of the wires also increases the efficiency of the heaters.

The two wires are wound in a helical fashion along the outside of the glass envelope 12 of the lamp 1, the pitch P between turns of a wire being approximately twice the external diameter of the lamp. The two wires 15 and 16 are wound in the same sense, but start from points that are diametrically opposite one another, so that the distance between the two wires along the length of the envelope 12 is half a pitch and the two wires are diametrically opposite one another at all points along the envelope. The pitch may be varied to adjust the luminous efficiency in the glow mode. The wires 15 and 16 are wound around a central part along the length of the lamp 1 and do not extend over the region of the lamp occupied by the internal electrodes 10 and 11, so as to avoid distortion of the glow mode electric field caused by the internal electrodes. The wires 15 and 16 are secured to the outside of the envelope 12 by spots 40 of an adhesive every half revolution of the wire. The spots 40 of adhesive are located where they will be inconspicuous, on the sides of the lamp, so that the front facing the display to be illuminated is clear of adhesive. At one end of the resistance wires 15 and 16, they are joined to insulated copper leads 45 and 46, which in turn extend to the drive circuit 22. Because the two wires 15 and 16 are equally spaced from one another along their length and are diametrically opposite one another, the electric field between the wires always cuts the lamp, whatever its shape, and does not radiate much outside the lamp. The electric field produced by the glow mode discharge continually rotates in a helical fashion along the lamp, leading to an even illumination when the lamp is used with a conventional diffuser. Such a diffuser will also help smooth variations in light output close to the helical wires 15 and 16. The helical wires can be applied to lamps that are of circular, serpentine or other shape.

It has been found that the lamp system of the present invention can produce an even illumination over a wide range of brightness and can be smoothly faded or increased in brightness.

The invention could be used with both hot and cold cathode lamps.

What I claim is:

1. A gas discharge lamp comprising: an elongate envelope filled with a discharge gas; a pair of electrodes located at opposite ends of the envelope for causing discharge within the envelope; and a pair of glow mode electrodes extending along a part at least of the length of the envelope, wherein said glow mode electrodes are elongate conductive members wound helically about the envelope such that any point on one conductive member has a corresponding point located diametrically opposite on the other member.

2. A lamp according to claim 1, wherein the pitch of said helix of said two conductive members is approximately equal to twice the external diameter of said lamp.

3. A lamp according to claim 1, wherein said conductive members are wires.

4. A gas discharge lamp system comprising: a gas discharge lamp, said lamp having an elongate envelope filled with a discharge gas, a first pair of electrodes located at opposite ends of the envelope for causing discharge within the envelope; two glow mode electrodes extending helically along a part at least of the length of the envelope such that any point on one electrode has a corresponding point located diametrically opposite on the other electrode; a first alternating supply circuit; means connecting said first circuit to said first pair of electrodes to drive said electrodes and cause discharge within said lamp; a second alternating supply circuit; and means connecting said second circuit to said glow mode electrodes.

5. A system according to claim 4, including means for controlling said first and second circuits such that at high brightness only said first circuit drives said lamp, at low brightness only said second circuit drives said lamp, and at intermediate brightness said first circuit drives said first pair of electrodes for successive periods separated by spaces, and said second circuit drives said glow mode electrodes only during the spaces between the periods when said first pair of electrodes are being driven.

6. A system according to claim 5, wherein said first circuit is arranged to reduce the space between said periods of its output and said second circuit is arranged to increase the space between said periods of its output when an intermediate brightness of said lamp is to be increased.

7. A system according to claim 5, wherein said second circuit is arranged to drive said glow mode electrodes at a frequency of the order of at least 5 MHz.

8. A system according to claim 7, wherein said second circuit is arranged to drive said glow mode electrodes at a frequency of about 10 MHz.

9. A system according to claim 4, wherein said second circuit includes a transformer with a secondary winding, said secondary winding having a center tap connected to ground, and wherein said two glow mode electrodes are connected to opposite ends of said secondary winding.

10. A gas discharge lamp system comprising: a gas discharge lamp, said lamp having an elongate envelope filled with a discharge gas, a first pair of electrodes located at opposite ends of the envelope for causing discharge within the envelope, and at least one glow mode electrode extending along a part at least of the length of the envelope; a first circuit; means connecting said first circuit to said first pair of electrodes to drive said electrodes and cause discharge within said lamp; a second circuit; means connecting said second circuit to the or each said glow mode electrode; and means controlling said first and second circuits such that at high brightness only said first circuit drives said first pair of electrodes, at low brightness only said second circuit drives said second pair of electrodes, and at intermediate brightness said first circuit drives said first pair of electrodes for successive periods separated by spaces, and said second circuit drives the or each said glow mode electrode only during the spaces between the periods when said first pair of electrodes are being driven.

11. A system according to claim 10, wherein said second circuit is arranged to drive the or each said glow mode electrode at a frequency of the order of at least 5 MHz.

12. A system according to claim 10, wherein said first circuit is arranged to reduce the space between said periods of its output and said second circuit increases the space between said periods of its output when an intermediate brightness of said lamp is to be increased.

13. A dimmable gas discharge lamp system that exhibits no noticeable change in color of a lamp in the system as the lamp is dimmed, said system comprising: a gas discharge lamp having an elongate envelope filled with a discharge gas, a first pair of electrodes located within said envelope at opposite ends of the envelope for causing discharge within the envelope, and at least one glow mode electrode wound around the exterior of said envelope and extending along a part at least of the length of the envelope; a first circuit; means connecting said first circuit to said first pair of electrodes to drive said electrodes and cause discharge within said lamp; a second circuit; and means connecting said second circuit to the or each said glow mode electrode, said second circuit being arranged to drive the or each said glow mode electrode at a frequency of at least 5 MHz.

14. A system according to claim 11 or 13, wherein said second circuit is arranged to drive the or each said glow mode electrode at a frequency of about 10 MHz.

15. A system according to claim 10 or 13, including two said glow mode electrodes, said second circuit including a transformer with a secondary winding, said secondary winding having a center tap connected to ground, and said two glow mode electrodes being connected to opposite ends of said secondary winding.

16. A gas discharge lamp system comprising: a gas discharge lamp, said lamp having an elongate envelope filled with a discharge gas, a first pair of electrodes located at opposite ends of the envelope for causing discharge within the envelope, two glow mode electrodes extending helically along a part at least of the length of the envelope; a first alternating supply circuit; means connecting said first circuit to said first pair of electrodes to drive said electrodes and cause discharge within said lamp; a second alternating supply circuit operating at a higher frequency than said first circuit; means connecting said second circuit to the or each glow mode electrode; and means controlling said first and second circuits such that at high brightness only said first circuit drives said lamp, at low brightness only said second circuit drives said lamp, and at intermediate brightness said first circuit drives said first pair of electrodes for successive periods separated by spaces, and said second circuit drives the or each glow mode electrode only during the spaces between the periods when said first pair of electrodes are being driven.

17. A method of driving a gas discharge lamp of the kind having an elongate envelope filled with a discharge gas, a first pair of electrodes located at opposite ends of said envelope for causing discharge within said envelope, and at least one glow mode electrode extending along a part at least of the length of said envelope, wherein said lamp is driven by energizing only said first pair of electrodes at high brightness levels, energizing only the or each said glow mode electrode at low brightness levels, and at intermediate brightness levels energizing said first pair of electrodes for successive periods separated by spaces, and energizing the or each said glow mode electrode only during the spaces between the periods when said first pair of electrodes are driven.

18. A method according to claim 17, wherein the or each said glow mode electrode is driven at a frequency of the order of at least 5 MHz.

19. A method according to claim 17 or 18 including the steps of reducing the space between periods of signals supplied to said first pair of electrodes and increasing the space between periods of signals supplied to the or each said glow mode electrode when an intermediate brightness of the lamp is to be increased.

* * * * *